United States Patent

Kaytan

(10) Patent No.: US 7,411,012 B2
(45) Date of Patent: Aug. 12, 2008

(54) PLASTICIZED PVC COMPOSITIONS

(75) Inventor: Hasan Kaytan, Huerth (DE)

(73) Assignee: ISP Investments Inc., Wilmington, DE (US)

( * ) Notice: Subject to any disclaimer, the term of this patent is extended or adjusted under 35 U.S.C. 154(b) by 48 days.

(21) Appl. No.: 11/273,663

(22) Filed: Nov. 14, 2005

(65) Prior Publication Data

US 2007/0112104 A1 May 17, 2007

(51) Int. Cl.
*C08G 70/10* (2006.01)
(52) U.S. Cl. ...................... 524/104; 524/569
(58) Field of Classification Search ................. 524/104, 524/569
See application file for complete search history.

(56) References Cited

U.S. PATENT DOCUMENTS

| | | | | |
|---|---|---|---|---|
| 5,294,644 A | * | 3/1994 | Login et al. | 514/698 |
| 6,001,188 A | * | 12/1999 | Walsh et al. | 134/7 |
| 2003/0083405 A1 | * | 5/2003 | Wang et al. | 524/81 |

* cited by examiner

*Primary Examiner*—Peter D Mulcahy
(74) *Attorney, Agent, or Firm*—William J. Davis; John F. Kane

(57) ABSTRACT

A stable, plasticized composition of PVC polymer including a $C_4$-$C_{30}$ linear, branched or cyclo-alkyl pyrrolidone present in an amount of 5-400 phr sufficient to plasticize said PVC into a flexible state.

19 Claims, 2 Drawing Sheets

PLASTICIZED PVC COMPOSITIONS

BACKGROUND OF THE INVENTION

1. Field of the Invention

This invention relates to plasticized PVC compositions, and, more particularly, to stable plasticized PVC compositions including a $C_4$-$C_{30}$ alkyl pyrrolidone present in an amount sufficient to plasticize PVC and impart flexibility, softness, extensibility and lower melting temperatures to the PVC.

2. Description of the Prior Art

It is well known in the prior art that addition of certain organic compounds, called plasticizers, to PVC confers on the PVC desirable properties such as flexibility, softness, good feel and ease of processability, extensibility and lower melting temperature [Encyclopedia of PVC Vol. 1 and 2, L. I. Nass (1976)]. Plasticizers function by dissolving in PVC, reducing the cohesive energy density between the polymer chains and reducing the polar forces exerted by the halogen atoms present in PVC. For any organic compound to function as an effective plasticizer for PVC it (a) must possess very high miscibility with PVC, (b) must have polar groups and (c) must have a low tendency to diffuse and migrate out of the polymer during its effective service life. In addition, the plasticizer must not cause coloration to PVC, should be non-toxic, odorless, possess low volatility and be thermally stable at the temperature of mixing and compounding of PVC with the plasticizer.

A variety of organic compounds have been reported as effective plasticizers for PVC. These include esters of phthalic anhydride with aliphatic alcohols (linear/branched) with four to fifteen carbon atoms, epoxidized soybean oil, esters of trimellitic acids, phosphates, esters of benzoic and citric acids, and halogenated hydrocarbons. Higher molecular weight polyesters (800-6000) prepared by condensation of diols with adipic or sebacic acids are also used as plasticizers. Of these, phthalate-based plasticizers are the most widely used because of their excellent compatibility with PVC, ease of fusion and all-around desirable properties.

Nevertheless, phthalate esters are not without drawbacks. Dioctylphthalate has been implicated as a carcinogen causing liver cancer in rats. Their low molecular weights enable them to diffuse out of PVC rapidly and cause "fogging" (cloudy deposits) on glass and other transparent surfaces. Also they are easily extracted by organic solvents, making them unsuitable for use in applications requiring solvent contact.

The prior art in the plasticizer field is typified by the following U.S. patents and Published Applications: U.S. Pat. Nos. 5,777,014; 6,118,012; 6,706,815; 2004/0001948 and 2004/0198909.

U.S. Pat. 5,294,644 discloses surface active lactams which have particularly effective surfactant activity for active organic compounds such as agriculture chemicals and drugs. Many other interesting properties are attributed to such lactams including anti-stat, anti-block and lubricant properties. The particular utility for these lactams was its ability to form stable emulsion concentrates of water insoluble agricultural chemicals.

Accordingly, it is an object of this invention to provide long term plastification to PVC so as to impart flexibility, softness, extensibility and/or lower melting temperatures to PVC compositions.

Another object herein is to provide such plasticized PVC compositions for such applications as films, siding, sheets, pipe and tubing as well as calendered sheets, plastisols, foams and dispersions.

SUMMARY OF THE INVENTION

A stable, plasticized composition of PVC polymer includes a $C_4$-$C_{30}$ linear, branched or cyclo-alkyl pyrrolidone present in an amount of 5-400 phr (parts per hundred of rubber) sufficient to plasticize said PVC into a flexible state.

Preferably, the composition includes a $C_6$-$C_{20}$ alkyl pyrrolidone present in an amount of at least 5 phr, preferably 5-400 phr, and most preferably 10-100 phr. $C_8$-$C_{12}$ alkyl pyrrolidones which are liquid at room temperature are preferred for use herein.

The compositions of the invention provide PVC products characterized by a Shore A hardness value of <100 to <10 (semi rigid to extremely flexible).

The PVC product of the invention including the $C_4$-$C_{30}$ alkyl pyrrolidone plasticized composition, alone or in combination with one or more primary or secondary plasticizers, suitably may be in the form of a calendered sheet, plastisol, foam or dispersion in a film, siding, pipe or tubing and the like.

DETAILED DESCRIPTION OF THE INVENTION

Suitable alkyl pyrrolidones for use as plasticizers in PVC compositions are $C_4$-$C_{30}$ linear, branched or cyclo-alkyl pyrrolidones, preferably $C_6$-$C_{20}$ alkyl pyrrolidones including cyclohexyl pyrrolidone, and, most preferably, liquid at room temperature, such as linear N-octyl ($C_8$) pyrrolidone (NOP) and linear N-dodecyl ($C_{12}$) pyrrolidone (NDP), which are commercially available as Surfadone® LP-100 and 300, respectively, sold by International Specialty Products (ISP). These $C_8$ and $C_{12}$ alkyl pyrrolidones perform effectively in an amount of at least 5 phr, preferably 5-400 phr, and, most preferably, 10-100 phr of the PVC. This amount is sufficient to plasticize the PVC into a flexible state. A blend with one or more primary or secondary plasticizers may be used. Suitably this amount of plasticizer will form advantageous plasticized PVC in such diverse forms as calendared sheets, plastisols, foams and dispersions, in applications such as films, siding, pipe or tubing to impart flexibility, softness, extensibility and lower melting temperature to the PVC.

The examples which follow will more particularly illustrate the invention.

EXAMPLE 1

Typical PVC formulations according to the invention are given in Table 1 below.

TABLE 1

| | Example No. Charge (phr) | | | |
|---|---|---|---|---|
| Additive | 1 | 2 | 3 | 4 |
| VESTOLIT ® B 7021* (PVC) | 100 | 100 | 100 | 100 |
| VESTINOL ® 9** (DINP) | 60 | | | |

TABLE 1-continued

| Additive | Example No. Charge (phr) | | | |
|---|---|---|---|---|
| | 1 | 2 | 3 | 4 |
| Surfadone ® LP 100 (NOP) | | | 60 | |
| Surfadone ® LP 300 (NDP) | | | | 60 |

*Vestolit ® B 7021 (Vestolit Corp./Marl, Germany) is a S-PVC with a K value of 70.
**Vestinol ® 9 is Diisononylphthalate (DINP).

A. Preparation of Calendered Sheets Using Compositions of Table 1

Calendered sheets with the NOP and NDP formulations above were much softer and clearer than DINP. Sheets with NOP are most flexible; approximately twice as soft as the sheet with DINP. Also blends of DINP/NOP (3:1) and DINP/NDP (3:1) produced more flexible sheets then DINP alone at the same use level (60 phr).

B. Plastisols

Both NOP and NDP increased the viscosity of the plastisols indicating onset of gelation, and lowered its gelling temperature and increased the gelling. The higher alkyl pyrrolidone was more suitable for achieving long open times for plastisols.

C. Foams

The following formulations shown in Table 2 below were used.

TABLE 2

| Additive | Example No. Charge (phr) | | | | | |
|---|---|---|---|---|---|---|
| | 1 | 2 | 3 | 4 | 5 | 6 |
| VESTOLIT ® B 7021 | 100 | 100 | 100 | 100 | 100 | 100 |
| VESTINOL ® 9 | 57 | 52 | 47 | 52 | 47 | 42 |
| Surfadone ® LP 100 | | 5 | 10 | | | |
| Surfadone ® LP 300 | | | | 5 | 10 | 15 |
| Porofor ADC/L-C2* (1:1) | 6 | 6 | 6 | 6 | 6 | 6 |
| Lankromark LZK 125** | 1.5 | 1.5 | 1.5 | 1.5 | 1.5 | 1.5 |

*Profor ADC/L-C2 is a blowing agent based on azodicarbonamide.
**Lankomark LZK 125 is a mixed metal salt stabilizer.

Figure 1:
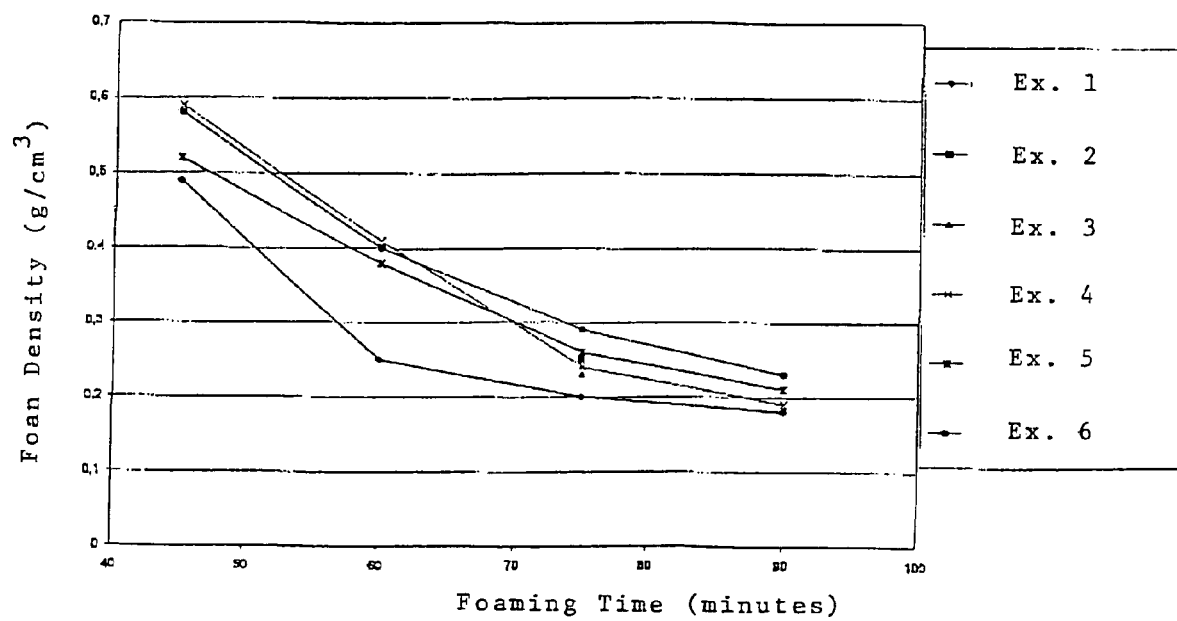
FIG. 1 is a plot of foam density vs. foaming time.

Foaming was performed with these formulations at 200° C. The resultant foam density (g/cm$^3$, y-axis) versus foaming time (s, x-axis) is shown in FIG. 1. The results show that addition of $C_8$ or $C_{12}$ alkyl pyrrolidone produce foams of higher foam density and greater stability than DINP. The addition of higher amounts NOP and NDP in the composition resulted in more even and smoother surfaces.

D. Dispersions 2-8% NOP or NDP in aqueous PVC dispersions lowered the Minimum Film Building Temperature (MFT) from 14° C. to 2° C., which is a significant reduction and a desirable result.

EXAMPLE 2

Plasticizing Efficiency of N-Dodecyl-2-Pyrrolidone

The following compositions shown in Table 3 below were used:

TABLE 3

| Additive | Example No. Charge (phr) | | | |
|---|---|---|---|---|
| | 1 | 2 | 3 | 4 |
| SOLVIN ® 271 PC* | 100 | 100 | 100 | 100 |
| VESTINOL ® 9 | 60 | | | |
| Surfadone ® LP 300 | | 20 | 40 | 60 |
| Baerostab ® CT 9156X** | 2.5 | 2.5 | 2.5 | 2.5 |

*Solvin 271 PC is a S-PVC with K value of 71.
**Baerostab CT 9156X is a Ca/Zn stabilizer.

Calendered sheets of these compositions were tested for Shore Hardness A, tensile strength, elongation at break, and water absorption after 1 d and 7 d (days).

TABLE 4

| Ex. | Shore Hardness A* | Property Tensile Strength** (N/mm$^2$) | Elongation at Break*** (mm) | Water Absorption (%) | |
|---|---|---|---|---|---|
| | | | | 1 d | 7 d |
| 1 | 77 | 20.0 | 136 | 0.14 | 0.19 |
| 2 | 96 | 23.5 | 79 | 0.14 | 0.18 |
| 3 | 77 | 11.8 | 94 | 0.43 | 0.67 |
| 4 | 63 | 6.8 | 117 | 0.88 | 1.15 |

*Test Method ASTM D-2240
**Test Method ASTM D-412
***Test Method ASTM D-42

The results in Table 4 show that invention formulations containing 40 phr NDP give a Shore Hardness A value that is equal to 60 phr Vestinol 9 (DINP) i.e. NDP is substantially more efficient than DINP in achieving a flexible PVC.

EXAMPLE 3

A. Reduced Gelling Temperatures
In NOP and NDP plasticized PVC compositions, PVC gelation occurs at 45° C. or lower.

B. Increased Gelling Speed
Plastification and gelation occurs faster with NOP and NDP plasticized PVC thus increasing production yield.

Figure 2:
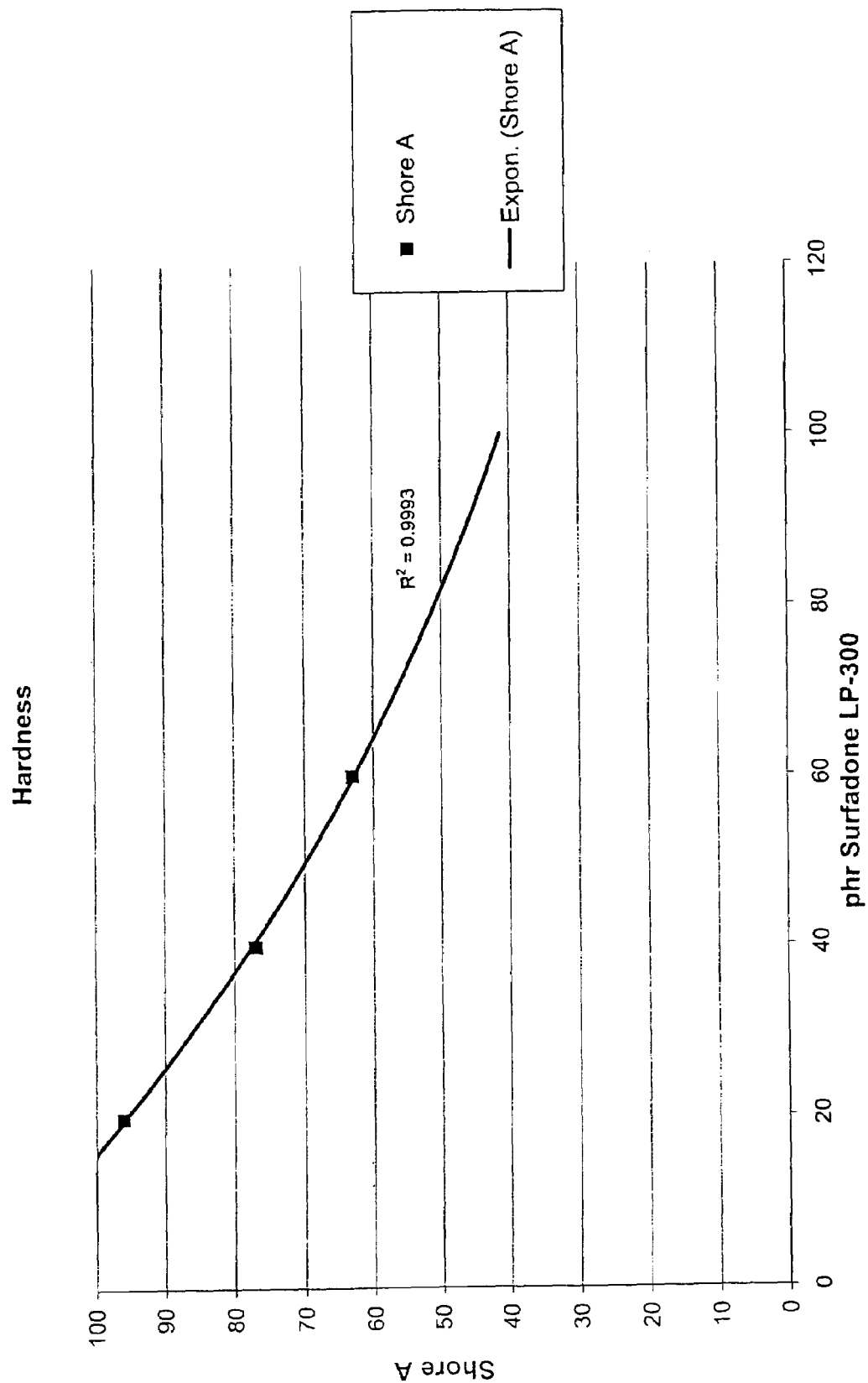
FIG. 2 is a plot of Shore A hardness as a function of the parts per hundred rubber of a plasticizer of the invention.

C. Elasticity
NDP is very efficient at producing highly elastic PVC at much lower use levels than with other plasticizers. With 100 phr NDP in PVC (K 70) a Shore A hardness of 40 is achievable (see FIG. 2).

The invention composition may be used effectively in such applications as insulations and jackets for wire and cable; liners for pools, ponds, landfill, irrigation trench; sheeting for waterbeds; fabric coating; carpet backing; automotive parts like dashboards, door panels, arm rests and other; car underbody coating; tiles; wall coverings; flooring sheets; packaging films; conveyor belts; tarpaulins; roofing membranes; electrical plug and connections; inflatable shelters; toys; garden hose; pipes and tubings; agricultural films; refrigerator and freezer gasketing; shoe soles and uppers, boots; fishing lures manufactured by using one of the state of the art technologies like calendaring, extrusion, plastisol, foam, dispersion.

While the invention has been described with particular reference to certain embodiments thereof, it will be understood that changes and modifications may be made which are within the skill of the art. Accordingly, it is intended to be bound only by the following claims, in which:

What is claimed is:

1. A stable, plasticized composition of PVC polymer including a $C_4$-$C_{30}$ linear, branched or cyclo-alkyl pyrrolidone present in an amount of 5-400 phr sufficient to plasticize said PVC into a flexible state.

2. A composition according to claim 1 wherein said amount is at least 10 phr.

3. A composition according to claim 1 wherein said amount is 10 to 100 phr.

4. A composition according to claim 1 which provides a PVC product characterized by a Shore A hardness value of <100.

5. A composition according to claim 1 which includes a $C_6$-$C_{20}$ alkyl pyrrolidone.

6. A composition according to claim 1 which includes a $C_6$-$C_{20}$ cyclo-alkyl pyrrolidone.

7. A composition according to claim 1 which is liquid at room temperature.

8. A composition according to claim 1 which includes a linear $C_8$ alkyl pyrrolidone.

9. A composition according to claim 1 which includes a linear $C_{12}$ alkyl pyrrolidone.

10. A PVC product including the composition of claim 1 is in the form of a calendared sheet, plastisol, foam, dispersion, film, siding, pipe or tubing.

11. A composition according to claim 7 further comprising a blend with one or more primary and/or secondary plasticizers.

12. A composition according to claim 1 wherein the alkyl pyrrolidone is liquid at room temperature.

13. A PVC product comprising a stable, plasticized composition of a PVC polymer including a $C_4$-$C_{30}$ linear, branched or cyclo-alkyl pyrrolidone present in an amount of 5-400 phr sufficient to plasticize said PVC into a flexible state wherein said PVC product has a Shore A hardness value of less than 100.

14. A PVC product according to claim 13 wherein the composition is in the form of a calendered sheet, plastisol, foam, dispersion, film, siding, pipe or tubing.

15. A PVC product according to claim 13 wherein said pyrrolidone is present in an amount of 10 to 100 phr.

16. A PVC product according to claim 13 wherein said PVC polymer includes a $C_6$-$C_{20}$ alkyl pyrrolidone.

17. A PVC product according to claim 13 wherein said PVC polymer includes a $C_6$-$C_{20}$ cyclo-alkyl pyrrolidone.

18. A PVC product according to claim 13 wherein said PVC polymer includes a linear $C_8$ alkyl pyrrolidone.

19. A PVC product according to claim 13 wherein said PVC polymer includes a linear $C_{12}$ alkyl pyrrolidone.

* * * * *